(12) United States Patent
Shimomura

(10) Patent No.: US 6,924,957 B2
(45) Date of Patent: Aug. 2, 2005

(54) METHOD AND APPARATUS FOR SERVO TRACK WRITE IN DISK DRIVE FOR PERPENDICULAR MAGNETIC RECORDING

(75) Inventor: Kazuhito Shimomura, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 303 days.

(21) Appl. No.: 10/190,702

(22) Filed: Jul. 9, 2002

(65) Prior Publication Data

US 2003/0021056 A1 Jan. 30, 2003

(30) Foreign Application Priority Data

Jul. 30, 2001 (JP) ........................................ 2001-230203

(51) Int. Cl.$^7$ .............................................. G11B 21/02
(52) U.S. Cl. ....................................................... 360/75
(58) Field of Search ............................. 360/40, 48, 75

(56) References Cited

U.S. PATENT DOCUMENTS

| | | | |
|---|---|---|---|
| 5,383,065 A | | 1/1995 | Hayashi |
| 6,025,971 A | | 2/2000 | Inoue et al. |
| 6,038,093 A | * | 3/2000 | Takada et al. ............... 360/66 |
| 2002/0034107 A1 | * | 3/2002 | Saito ........................ 365/200 |

FOREIGN PATENT DOCUMENTS

| | | |
|---|---|---|
| JP | 4-298816 | 10/1992 |
| JP | 5-2828 | 1/1993 |
| JP | 7-201002 | 8/1995 |
| JP | 9-282620 | 10/1997 |
| JP | 10-149539 | 6/1998 |
| JP | 11-16138 | 1/1999 |
| JP | 11-25402 | 1/1999 |
| JP | 11-120509 | 4/1999 |
| JP | 2000-322850 | 11/2000 |

OTHER PUBLICATIONS

W. Cain et al., "Challenges in the Practical Implementation of Perpendicular Magnetic Recording," IEEE Transactions on Magnetics, vol. 32, No. 1, Jan. 1996, pp.97–102.

Office Action, dated Apr. 27, 2004 from the Japanese Patent Office for Patent Application No. 2001–230203 (including an English translation).

"Head for Reducing the Skew Effect of a Single Magnetic–Pole Head", Nikkei Elec. Feb. 12, 2001, 8$^{th}$ MMM–Intermag joint conference (CA–02).

* cited by examiner

Primary Examiner—Sinh Tran
Assistant Examiner—Mitchell R Slavitt
(74) Attorney, Agent, or Firm—Pillsbury Winthrop, LLP

(57) ABSTRACT

A servo track write method is disclosed in which, in a disk drive of a perpendicular magnetic recording system, servo data is written with the use of a single magnetic pole type head of the disk drive itself. In this method, the servo data is recorded on a disk in those servo areas with the use of the single magnetic hole type head mounted on the disk drive. A head mounted as the single magnetic pole type head is position-controlled relative to the servo area by a servo track writer. The servo data is recorded with perpendicular magnetization under a recording magnetic field from the single magnetic pole type head in accordance with the magnetic pole thickness of the single magnetic pole type head.

10 Claims, 4 Drawing Sheets

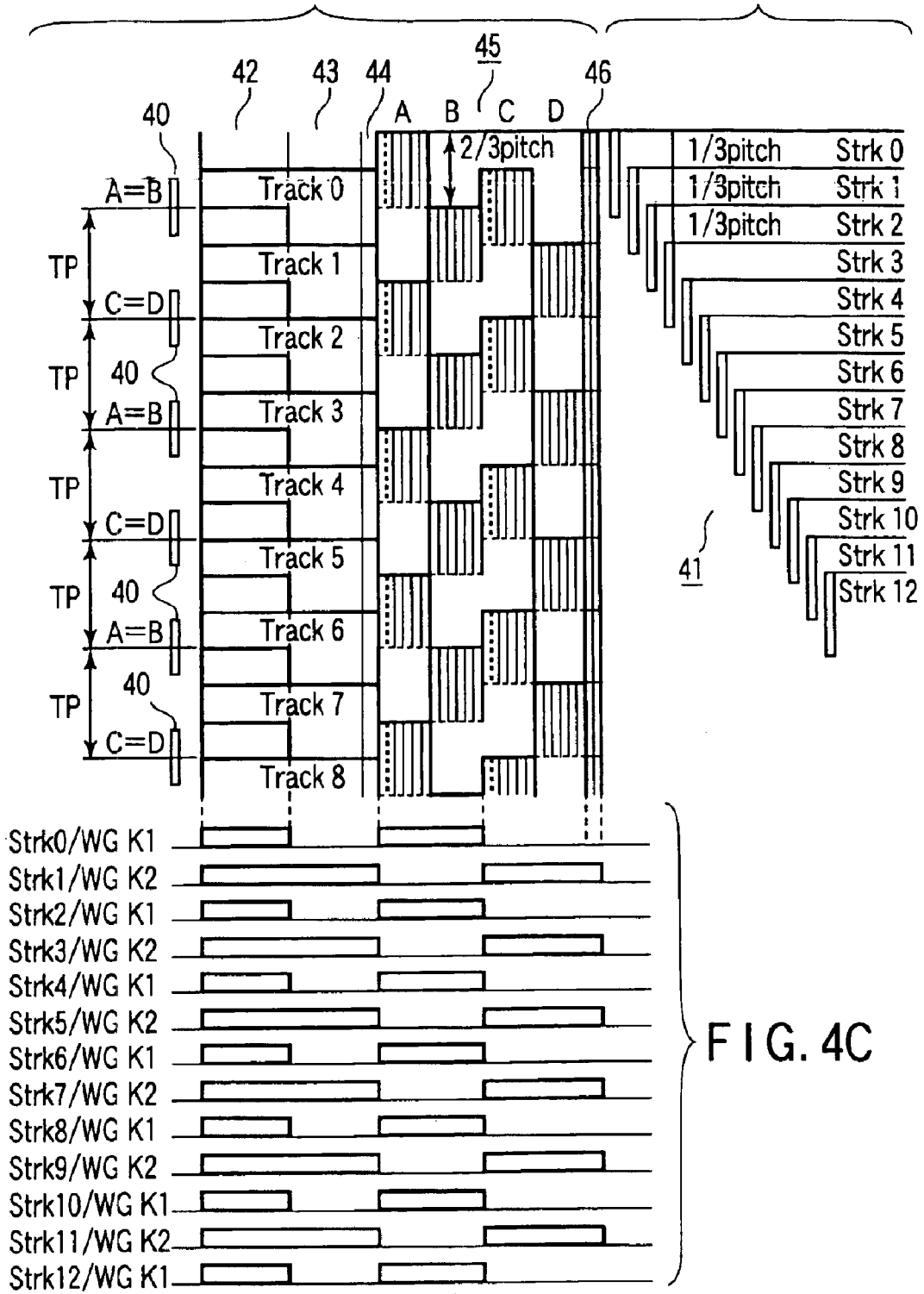

→| |←23ns

→| |←30ns

→| |←43ns

METHOD AND APPARATUS FOR SERVO TRACK WRITE IN DISK DRIVE FOR PERPENDICULAR MAGNETIC RECORDING

CROSS-REFERENCE TO RELATED APPLICATIONS

This application is based upon and claims the benefit of priority from the prior Japanese Patent Application No. 2001-230203, filed Jul. 30, 2001, the entire contents of which are incorporated herein by reference.

BACKGROUND OF THE INVENTION

1. Field of the Invention

The present invention relates generally to a disk drive of a perpendicular magnetic recording system using a single magnetic pole type head and, in particular, to a servo write method for recording servo data on a disk.

2. Description of the Related Art

In recent years, attention has been paid to the perpendicular magnetic recording system as a technique for overcoming the limitation of recording density in the longitudinal magnetic recording (in-plane magnetic recording) system, in the field of a magnetic disk drive represented by a hard disk drive. In this perpendicular magnetic recording system, the recent tendency has been toward promoting the practical use of a disk drive of a type using a disk of a double-layered structure as a data recording medium.

A disk with such a double-layered structure has a recording magnetic layer revealing a perpendicular magnetic anisotropy and a soft magnetic layer formed between the recording magnetic layer and a substrate. The soft magnetic layer has the function of creating a closed magnetic path of a magnetic flux generated in one magnetic pole of a head to the other magnetic pole at the time of recording data.

In the disk drive of the perpendicular magnetic recording system, use has been made of, as a read head, an active element represented by an MR (magnetoresistive) element (including a GMR element) as in the case of the longitudinal magnetic recording system, while, on the other hand, use is made of, as a write head, a ring type head or a single magnetic pole type head as in the case of the longitudinal magnetic recording system. In general, use is made, in the disk drive, of a magnetic head having a read head and write head mounted in a separate way on one slider.

The ring type head can be used for either the perpendicular magnetic recording system or the longitudinal magnetic recording system. The single magnetic pole type head, on the other hand, has been developed as a write head for perpendicular magnetic recording only. If, therefore, the practical use of the perpendicular magnetic recording system is promoted, there is a high possibility that many more single magnetic pole type heads are employed.

In short, with the above-mentioned trend thus promoted, there is a high possibility that, as the disk drive of a perpendicular magnetic recording system, the mainstream will be toward adopting a drive using a disk of a double-layered structure as a data recording medium as well as using a single magnetic pole type head as the write head.

It is well known that, in the manufacturing process of a disk drive, a servo write step is done for recording servo data on the disk in servo areas. The servo data is used, prior to a read/write operation, to control the positioning of a head (read/write head) to a target position (a track to be accessed) on a disk.

Generally, in the servo write step, a dedicated device called a servo track writer (STW) is used to perform recording processing of servo data on a disk drive with a drive mechanism for a head, disk etc., assembled thereon. In the disk drive of a longitudinal magnetic recording system, the recording processing of the servo data by the STW is normally carried out.

In the perpendicular magnetic recording system, no practical disk drive has been developed as a manufactured product to this day except for an experimental drive. There is no actual report that the recording processing of servo data is carried out by a servo write step of any practical stage. In particular, in the disk drive of a perpendicular magnetic recording system using a single magnetic pole type head and disk of a two-layered structure, no servo write step of any practical stage has been achieved though such a disk drive will be able to be realized as a near-future mainstream product.

BRIEF SUMMARY OF THE INVENTION

It is accordingly the object of the present invention to provide a servo write method which allows the practical use of a servo write process of writing servo data on a disk of a two-layered structure in particular by a single magnetic pole type head in a disk drive of a perpendicular magnetic recording system.

In accordance with one aspect of the present invention there is provided a servo write method applied to a disk drive of a perpendicular magnetic recording system using a single magnetic pole type head as a write head and a disk of a two-layered structure, the method comprising recording servo data on a disk with the use of the single magnetic pole type head.

The present servo write method comprising the steps of controlling the positioning of the single magnetic pole type head on an area set as a servo area on the disk and performing perpendicular magnetization recording of servo data on the servo area under a recording magnetic field generated from the single magnetic pole type head in accordance with the magnetic pole thickness of the single magnetic pole type head.

BRIEF DESCRIPTION OF THE SEVERAL VIEWS OF THE DRAWING

FIGS. 4A to 4C are views for explaining a servo write process relating to the present embodiment;

DETAILED DESCRIPTION OF THE INVENTION

The embodiment of the present invention will be described below by referring to the accompanying drawing.

(Disk Drive Mechanism)

Figure 1:
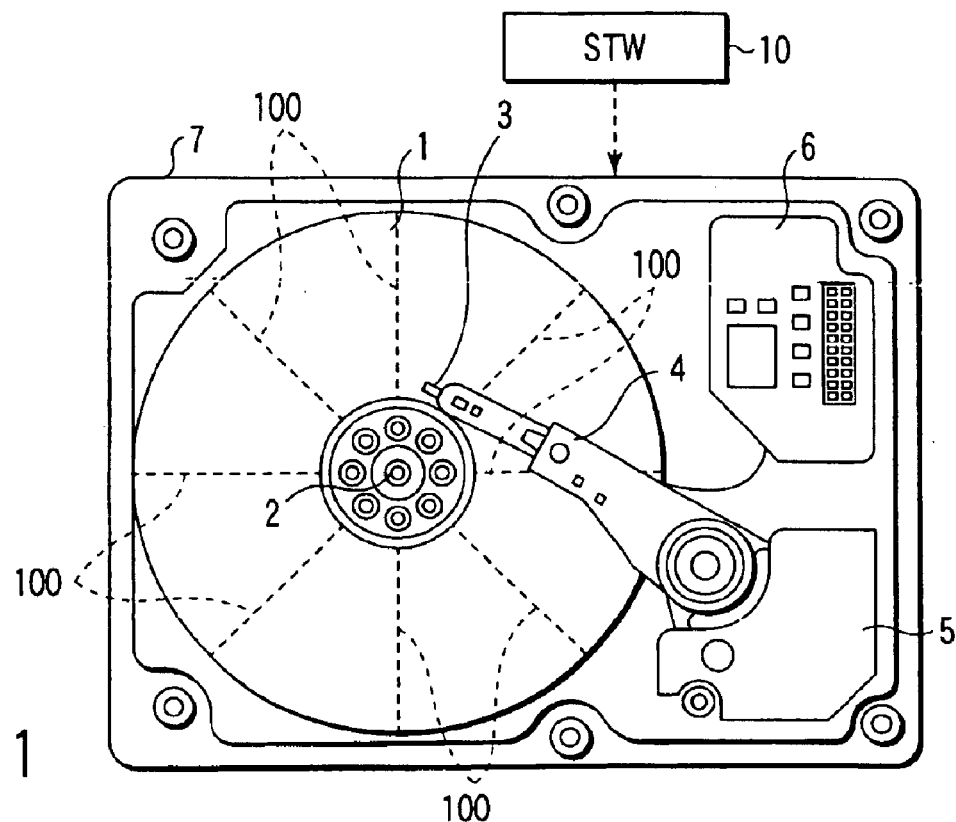
FIG. 1 is a view for explaining a disk drive and a servo track writer relating to an embodiment of the present invention.

FIG. 1 shows a major section of a perpendicular magnetic recording system according to this embodiment. The disk drive has a housing (a top cover is omitted) 7 for a drive body having a built-in driving mechanism including a disk 1, a spindle motor (SPM) and an actuator. The actuator comprises an arm 4 including a suspension with a head 3 mounted thereon and a voice coil motor (VCM) 5 for moving the arm 4 in a radial direction over the disk. A circuit board 6 with a pre-amplifier circuit, etc., attached thereto is arranged in the housing 7. The pre-amplifier circuit is connected through an FPC (flexible printed cable) to a head 3 to allow transmission of a read/write signal.

Figure 2:
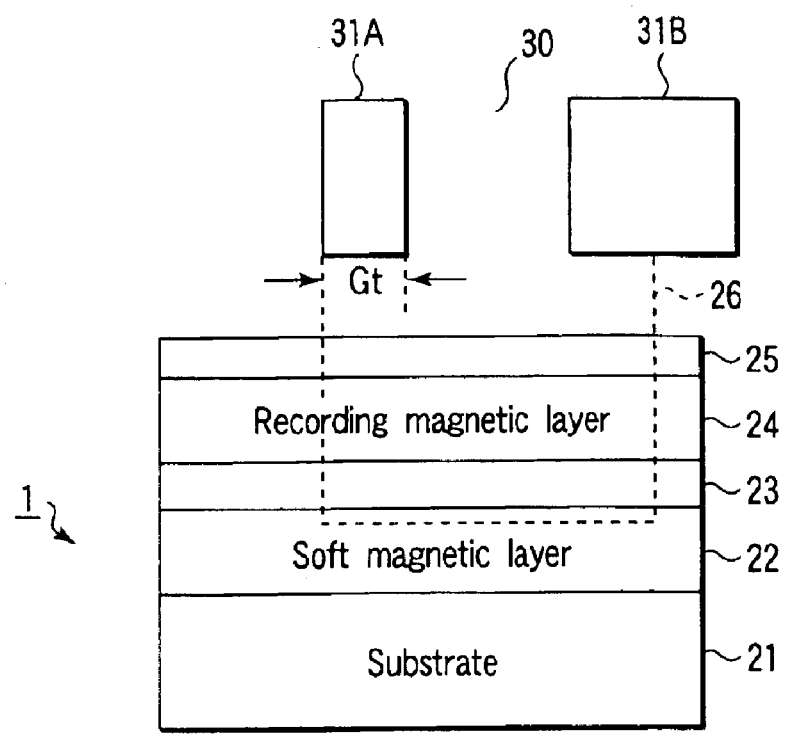
FIG. 2 is a view for explaining a disk of a two-layered structure and a single magnetic pole type head in the present embodiment.

The head 3 is mounted on a single slider and comprises a write head (30) comprised of a single magnetic pole type head for perpendicular magnetization recording only and a read head (32) comprised of an MR (GMR) element. The single magnetic pole type head (write head) 30 comprises, as shown in FIG. 2, a main magnetic pole 31A for generating a perpendicular magnetic field and an auxiliary magnetic pole 31B. The main magnetic pole 31A has a later-described magnetic pole thickness (Gt) and generates a foot stamping portion (incomplete erasing portion) at the time of perpendicular recording.

On the other hand, the disk 1 is comprised of a double-layered structure having, as shown in FIG. 2, a recording magnetic layer 24 of a perpendicular magnetic anisotropy and a soft magnetic layer 22 formed between the recording magnetic layer and a substrate 21. An intermediate control layer 23 is provided between the soft magnetic layer 22 and the recording magnetic layer 24. A surface protective film 25 is provided on the surface of the recording magnetic layer 24.

In the perpendicular magnetic recording system, as shown in FIG. 2, a perpendicular magnetic field corresponding to write data is generated in the main magnetic pole 31A of the single magnetic pole type head 30. By doing so, a closed magnetic path (indicated by the dotted line) of the main magnetic pole 31A, soft magnetic layer and auxiliary magnetic pole 31B is created to allow a perpendicular magnetic recording to be made on the recording magnetic layer 24 of the disk 1.

Figure 3:
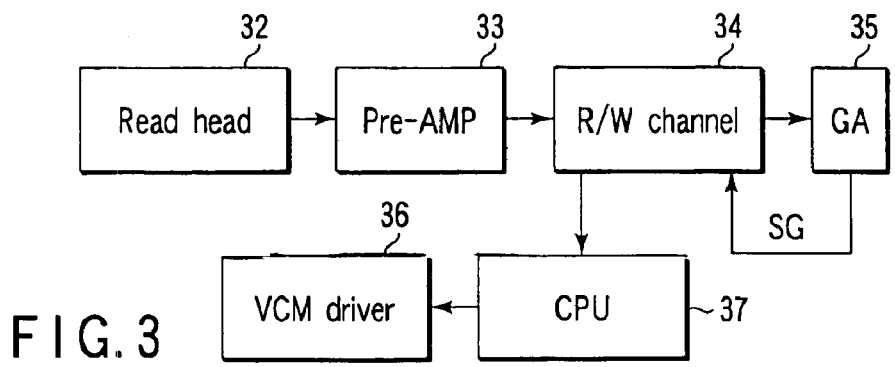
FIG. 3 is a view for explaining a servo system of a disk drive relating to the present embodiment.

Further, the disk drive has a system (including a servo system) for reproducing recorded data from the disk 1 as shown in FIG. 3. Here, the system will be explained below as being the servo system for reproducing the recorded servo data from the disk 1.

The system includes a read head 32, a pre-amplifier circuit 33, a read/write (R/W) channel 34, a gate array (GA) 35, a VCM driver 36 and a microprocessor (CPU 37). The read head 32 reads out recorded servo data from the disk 1 and the read signal is output to the pre-amplifier circuit 33. The pre-amplifier circuit 33 amplifies the read signal and sends it to the R/W channel 34.

Based on the timing of the servo gate SG generated from the gate array (logic gate circuit) 35, the R/W channel 34 extracts (reproduces) the servo data from the read signal and sends it to the CPU 37. The CPU 37 constitutes a main control unit for the servo system and drive and performs servo control under which the VCM driver 26 is controlled based on the reproduced servo data. Under the control of the CPU 37, the VCM driver 26 drives the VCM 5 to locate the head 3 at a target position on the disk 1.

(Servo Write Method)

In the manufacturing process of a disk drive of the above-mentioned perpendicular magnetic recording system, as shown in FIG. 1, a servo write step is performed for recording servo data on servo areas 100 of predetermined areas on the disk 1 with the use of a servo track writer (STM) 10. The servo write method relating to the present embodiment will be described below with reference to not only FIGS. 1 to 3 but also FIGS. 4A to 6C.

In the servo write method relating to the present embodiment, the actuator of the drive is driven under control of a servo track writer (STW) 10. And a perpendicular magnetic field is generated in a write head (single magnetic pole type head) 30 of a head 3 to allow the servo data to be magnetically recorded on the servo areas 100 on the disk 1.

Here, in the perpendicular magnetic recording by the single magnetic pole head 30, there occurs the known phenomenon that the planar configuration of the magnetic pole as viewed from an ABS (air bearing surface) of the slider is recorded on the disk 1 to cause previous history data (here, the previously recorded servo data or servo pattern) to be erased by being overwritten. This erased portion is called a foot stamped portion and remains as not being completely erased portion, that is, an incompletely erased portion. In the servo write step using the single magnetic pole type head 30, therefore, the portion of the servo data corresponding to the foot stamped portion is generated as not being a normally recorded portion (incompletely erased portion). Further, when the angle becomes prominent between the track direction of the rotating disk 1 and the longitudinal direction of the single magnetic pole type head 30, that is, when the skew angle becomes prominent, the foot stamping portion appears prominent and, in a worse situation, the edge portion of the magnetization transfer configuration of the magnetic recording area is distorted.

It is estimated that as shown in FIG. 2, a cause for the occurrence of such a foot stamping portion has relevance to the magnetic pole thickness Gt of the main magnetic pole 31A of the single magnetic pole type head 30 and this occurs due to a delay from the interruption of the recording current until the magnetic field leaking from the main magnetic pole 31A disappears completely. From this it is seen that the greater the magnetic pole thickness Gt of the magnetic pole configuration, in particular, the magnetic pole thickness Gt corresponding to that length relative to the track direction on the disk 1, the greater the range of the foot stamping portion relative to the track direction.

In other words, the foot stamping portion corresponds to the erase width of the servo data and, if its erase amount is expressed in terms of time Tg, is found from the following relation (1):

$$Tg\ Gt/Ve \qquad (1)$$

where Ve denotes the peripheral speed of the disk 1.

With reference to FIGS. 4A to 4C, an explanation will be made below about the write timing of the servo data in the servo write process of the present embodiment.

Generally, in the disk drive, an AGC (auto gain control) signal section 42, a track address code section 43, a pad section 44, a servo burst pattern section (hereinafter referred to as a burst pattern section) 45 and a gap section 46 are recorded as servo data (pattern) on the servo area 100 on the disk 1 as shown in FIG. 4A.

Of the servo data, the track address code section 43 and burst pattern section 45 for use in the positioning control (servo control) of the head 3 constitute servo data in the narrow sense of the word. In FIG. 4A, track codes are recorded on the track address code section 43 to respectively identify tracks 0 to 8.

On the other hand, the burst pattern section 45 comprises burst patterns A, B for detecting the center position of the respective tracks and burst patterns C, D for detecting the track boundary position. The servo system performs position error calculation processing with the use of the respective amplitude values of the burst patterns A to D read out from the read head 32. Based on the result of the position error, the servo system detects the position 40 of the read head 32 at the center position (A=B) or boundary position (C=D) of the track as shown in FIG. 4A. It is to be noted that, in the burst pattern section 45 shown in FIG. 4A, those portions of the patterns A to D as indicated by the dotted lines correspond to a DC erase boundary.

FIG. 4B shows a state in which, in the servo writing of the embodiment, the write head (single magnetic pole type head) 30 records servo data while being fed at ⅓ pitch of a track pitch TP. That is, here, the write head 30 can perform 12 position feeding strokes (Strk 0 to 12) and erase a previous history magnetized state (perpendicular magnetic recording) and can record the burst patterns A to D of ⅔ pitch by performing overwriting. Here, FIG. 4C shows the write gate (WG) for determining the timings of recording the servo data by generating a perpendicular magnetic field by the single magnetic pole type head 30 at the 12 position feeding strokes (strk 0 to 12). That is, at a timing K1 of the write gate WG, recording is made at the AGC signal section 42 and at the burst patterns A, B. At a timing K2 of the write gate WG, recording is made at the AGC signal section 42, track address code section 43, pad section 44, burst patterns C, D and gap section 46. By repeating these, servo data is recorded on the disk 1 at all the servo areas 100.

In the servo writing of the present embodiment, since the single magnetic pole type head of the drive is used as the write head, there occurs an incompletely erased portion corresponding to the foot stamped portion as set out above. That is, the portion of the servo data is erased in accordance with the magnetic pole thickness Gt (for example, about 0.3 μm) of the single magnetic pole type head 30. Stated in more detail, the servo data is erased at a portion corresponding to the magnetic pole thickness Gt from the ending of the gate WG. For example, after the ending of a timing (K2) in which the pad section 44 is completely recorded, an erased portion (not normally recorded portion) is formed at the head portion of the burst pattern A to an extent (for example, about 0.3 μm) corresponding to the magnetic pole thickness Gt. Similarly, an erased portion is created at the ending portion of the burst pattern B and at the head portion of the burst pattern C. The range of the erased portion is determined by the above-mentioned relation (1).

In the servo writing of the embodiment, the previous history servo data to be erased by the erase time Tg of the relation (1) can be prevented from being recorded by delaying the timing of the write gate. Since there exists no previous history servo data to be erased due to the foot stamping effect involved, it is possible to prevent an incomplete erasing portion from remaining as a left-unerased portion. In other words, an area corresponding to the foot stamping portion can be made in a completely erased state.

Stated in more detail, the magnetized polarity of the previous history servo data is so set as to be matched to an inverted direction of magnetization to be erased due to the foot stamping portion involved. In the case where, for example, in an NRZI series of servo data, a pattern ends with [••101010] and a previous history servo pattern starts with [0101••], a servo pattern to be erased gives an inverted magnetization corresponding to a second bit position [1] of the previous history servo pattern. If, therefore, the second bit position is present within a time Tg satisfying the above relation (1), then through the erase process an inverted magnetization corresponding to the second bit position [1] of the previous history servo pattern at each radial position remains unerased from the complete erasure during the incomplete erase period.

In short, it is possible to achieve an improved signal quality in the reproduction operation of the servo data by completely erasing incompletely erased magnetization. In this case, the timing of the write gate is delayed so that recording is made as a previous history servo pattern from a third bit position of the servo pattern. Simultaneously therewith, the servo pattern is so controlled as to allow an inverted direction of magnetization first appearing after the erasure of the previous history servo pattern to be matched to an inverted direction of magnetization in the erased state.

In this case, the amount of timing delay obeys the relation (1) but there occurs a delay from the ending of the write gate until the actual write current ceases. It is, therefore, desirable that, as an actual delay amount, the time Tg be made greater by an extent a. Further, in order to maintain a predetermined data quality without reducing the information amount of servo data, it is effective to delay the time by [Tg+1] but as a delay amount in terms of a servo bit length.

Figure 6A:
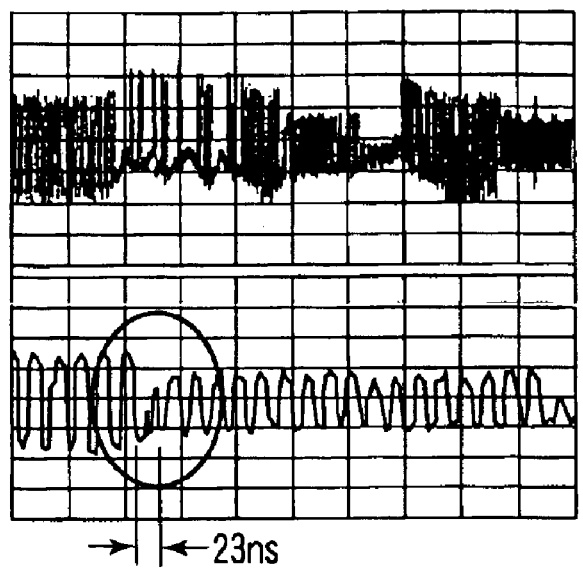
FIGS. 6A to 6C are views for explaining a servo data recorded state in a servo write process relating to the present embodiment.
Figure 6B:
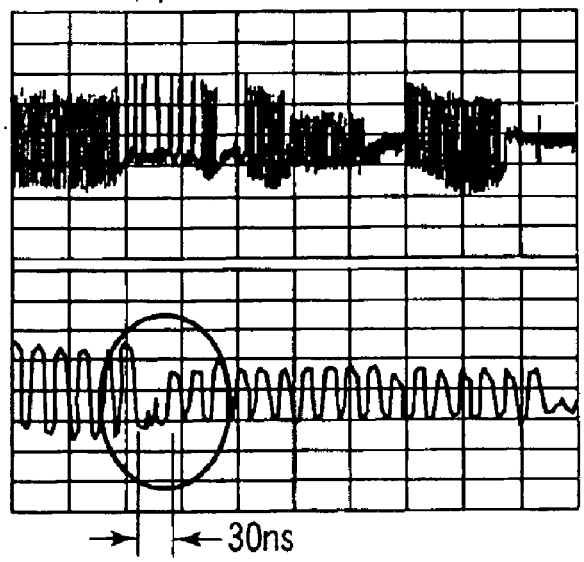
Figure 6C:
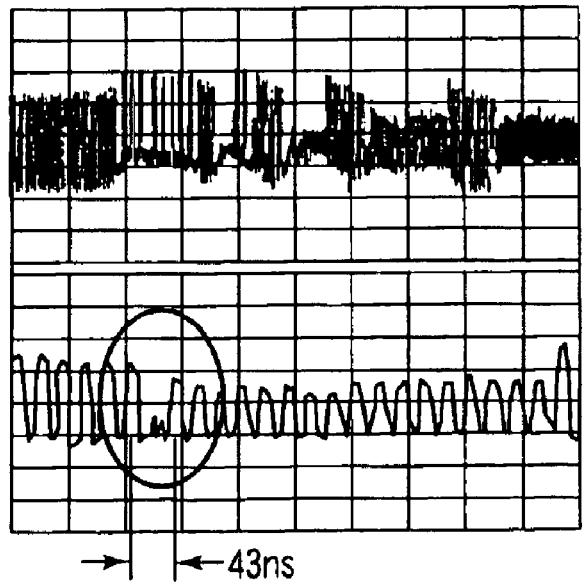

FIGS. 6A to GC show read signal waveforms involved when the servo data recorded by the servo write step in the present embodiment is read out by a read head comprised of a GMR. FIG. 6A shows an enlarged waveform diagram of the latter half of the track address code section 43, pad section 44 and burst pattern A section at an outer peripheral portion of the disk 1 (at a position 28.9 mm from the center). Similarly, FIG. 6B shows an enlarged waveform diagram showing the latter half of the track address code section 43, pad section 44 and burst pattern A section at an intermediate portion of the disk 1 (at a position 22.21 mm from the center). Further, FIG. 6C shows an enlarged waveform diagram showing the latter half of the track address code section 43, pad section 44 and burst pattern A section at an inner peripheral portion of the disk 1 (at a position 15.8 mm from the center). In the embodiment above, since the magnetic pole thickness Gt of the write head (single magnetic pole type head) 30 is about 0.3 μm, it is seen from the relation (1) that an incompletely erased portion (foot stamped portion) occurs at the time Tg of 23 ns, ns, 43 ns. Further, since the servo data is recorded at intervals of 12.5 MHz, one magnetic inversion time becomes 40 ns. In this case, from the relation between the erase portion and the magnetization transfer interval, the head magnetization portion of the burst pattern A is erased to the extent of 50% at the outer peripheral portion, to the extent of 90% at the intermediate portion and to the extent of 100% at the inner peripheral portion.

(Timing Control of Servo Gate)

An explanation will be made below about reproducing the burst patterns A to D in particular on the disk 1 with the servo data recorded thereon by the servo write step of the present embodiment and on a disk drive having the single magnetic pole type head as the write head.

Here, it is supposed that the magnetic pole thickness Gt of the single magnetic pole type head 30 is about 0.3 μm and the magnetization inversion number of the respective burst patterns A to D corresponds to nine bits. In this case, the timing taking time Ts of the servo gate SG which is generated to obtain a position error signal from the respective burst patterns A to D is determined by the following relation (2):

$$Ts \leq Tb - (2 \times \Delta T + Tg) \qquad (2)$$

where Tb denotes the servo data existing time and $\Delta T$ the rotation variation of the disk 1.

With Tss representing the start time of the timing taking time Ts, Tse the end time, Tbs the servo data existing start time and Tbe the servo data existing end time, the following relations (3) and (4) are established:

$$Tss \geq Tbs - (\Delta T + Tg) \quad (3)$$

$$Tse \leq Tbe - \Delta T \quad (4)$$

Figure 5:
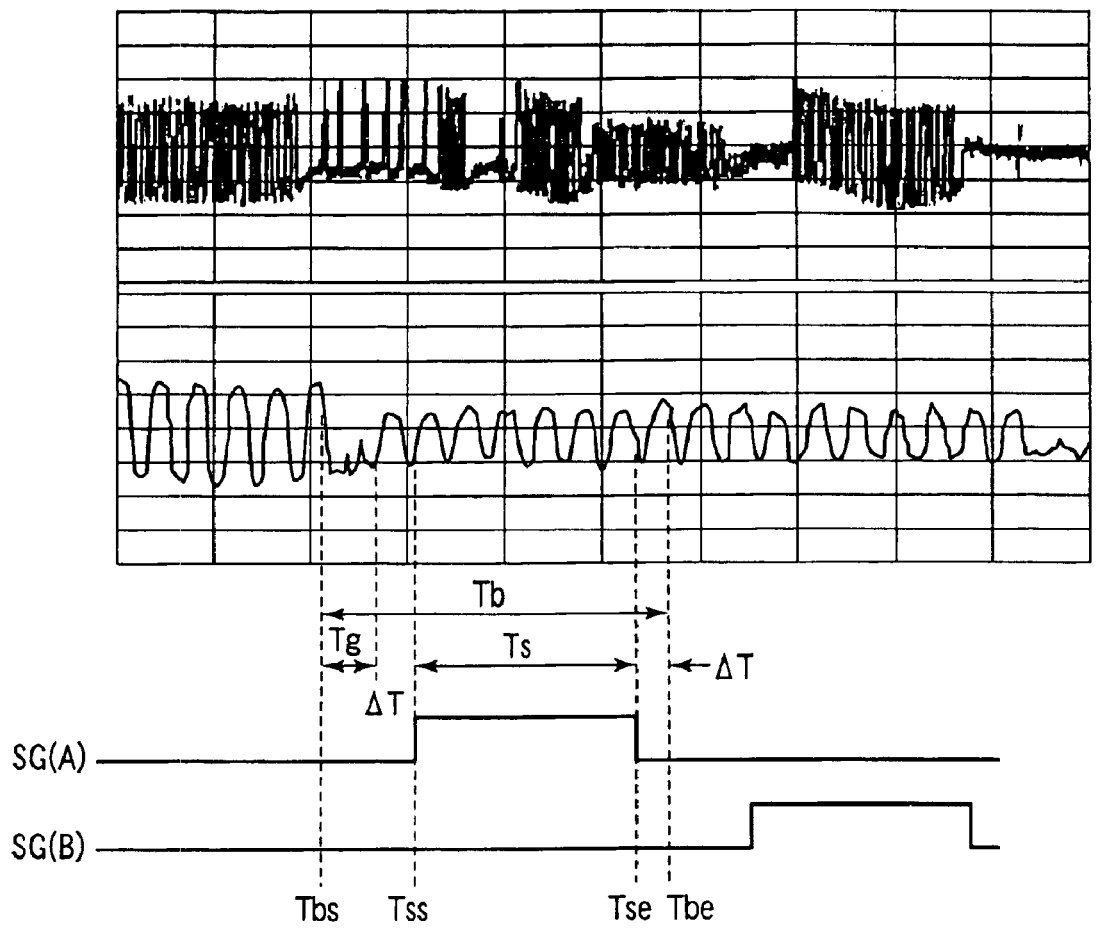
FIG. 5 is a view for explaining the timing control of a servo gate in a servo system relating to the present embodiment.

In the practical disk drive, the gate way 35 shown in FIG. 3 outputs a servo gate SG signal which satisfies the relations (2) to (4) as a timing taking signal to the read/write channel 34. By doing so, the read/write channel 34 can positively reproduce burst patterns A to D having an incompletely erased portion as set out above. FIG. 5 shows practical timing control by those servo gates SG (A), SG (B) necessary to reproduce burst patterns A, B based on the relations (2) to (4).

According to the disk drive of the present embodiment, as set out above, even if any erase portion is left on the servo data of the disk 1 due to the foot stamping effect, it is possible to positively reproduce burst patterns A to D in particular by controlling the timing of the servo gate SG so as to satisfy the above-mentioned relations (2) to (4). As a result, positive servo control can be realized in the disk drive of a practical perpendicular magnetic recording system without lowering the positioning accuracy of the head.

(Variant)

A variant of the above-mentioned embodiment comprises previously adding servo data corresponding to that which is erased due to the foot stamping effect produced by the single magnetic pole type head 30. That is, an amount of servo data corresponding to that erased within a time Tg is added by initially increasing the servo data existing time Tb. Here, with Tbn representing a newly set servo data existing time, the following relation (5) is established:

$$Tbn \geq Tb + Tg \quad (5)$$

Further, with N representing a bit amount of the portion of the adding servo data, Tb the magnetization inversion time corresponding to the bit amount, and Tg the time corresponding to a range in which the portion of the servo data is not recorded, the bit amount N can be calculated from the following relation (6):

$$N \geq \text{Integer}(Tg/Tb) + 1 \quad (6)$$

where Integer denotes an integral number.

According to the variant, the servo data erased due to the foot stamping effect is initially predicted and the corresponding servo data is added at the servo write step. By doing so it is possible to restore the erased servo data. Even in this case, the servo system of the disk drive, when performing servo control, needs to perform the timing control of the servo gate so as to satisfy the above-mentioned relations (2) to (4).

(Advantage of the Embodiment)

In short, according to the above-mentioned embodiment and variant, it is not necessary to develop a perpendicular magnetic recording head for servo writing only which records the servo data at the servo write step and it is possible to realize the servo write operation by the write head constituting the single magnetic pole type head mounted on the disk drive. That is, it is possible to take into consideration the erase portion (time Tg) of the servo data, at the time of servo writing, resulting from the foot stamping effect dependent upon the magnetic pole thickness Gt of the single magnetic pole type head. For a disk drive with a servo data-recorded disk placed thereon it is possible to effect the timing control of the servo gate with consideration given to the erase portion of the servo data or to, by the addition of servo data corresponding to the erase servo data, avoid a lowering in quality of the servo data obtained under servo control. It is, therefore, possible to promote the practical use of a disk drive of a perpendicular magnetic recording system using a single magnetic pole type head as a write head and a disk of a double-layered structure.

In other words, in the recording operation by the single magnetic pole type head, there occurs a foot stamping portion (incomplete erase portion) in a range corresponding to the magnetic pole thickness. When, therefore, the servo data is perpendicular magnetization recorded on the servo area, the portion of the servo data is not recorded in a range corresponding to the magnetic pole thickness. By the servo write method taking into consideration the magnetic pole thickness of the single magnetic pole type head it is possible to realize a servo write step capable of putting the perpendicular magnetic recording system to practical use.

Further, according to the present embodiment, it is possible to, by the servo write method of the perpendicular magnetic recording system, provide a disk of a double-layered structure with servo data initially recorded thereon and a disk drive having a single magnetic pole type head as a write head. Since the disk drive erases the portion of the servo data in a range corresponding to a foot stamping portion it has the function of controlling the timing of the servo gate.

According to the present embodiment, as set out in more detail above, the servo write step for writing servo data on a disk of a double-layered structure is practically feasible using, in particular, a single magnetic pole type head in a disk drive of a perpendicular magnetic recording system. By doing so, it is possible to realize a practical disk drive of a perpendicular magnetic recording system.

What is claimed is:

1. A servo write method applied to a magnetic disk apparatus of a perpendicular magnetic recording system using a single magnetic pole type head as a write head relative to a double-layered disk as a data recording medium, the method comprising:

position-controlling the single magnetic pole type head on an area set as a servo area on the disk; and effecting perpendicular magnetization recording of servo data on the servo area under a recording magnetic field generated from the single magnetic pole type head in accordance with the magnetic pole thickness of the single magnetic pole type head, wherein, when the servo data is perpendicular magnetization recorded on the servo area, the portion of the servo data is not recorded in a range corresponding to the magnetic pole thickness of the single magnetic pole type head.

2. A method according to claim 1, wherein, when the servo data is perpendicular magnetization recorded on the servo area, the portion of the servo data is erased only in a range corresponding to the magnetic pole thickness of the single magnetic pole type head.

3. A method according to claim 1, wherein, when the servo data is perpendicular magnetization recorded on the servo area, an erase area identifiable as an erasing portion of the servo data corresponding to the magnetic pole thickness of the single magnetic type head is left as a foot stamping portion of the magnetic pole on the disk.

4. A method according to claim 1, wherein the portion of the servo data is not recorded in a range corresponding to a time Tg and the time Tg can be calculated by the relation Tg=Gt/Ve where Gt denotes the magnetic pole thickness of the single magnetic pole type head and Ve peripheral speed of the disk.

5. A method according to claim 1, wherein, when the servo data is perpendicular magnetization recorded, the portion of the servo data not recorded in a range corresponding to the magnetic pole thickness of the single magnetic pole type head is previously added.

6. A method according to claim 5, wherein, with N representing a bit amount corresponding to the adding portion of the servo data, Tb magnetization inversion time corresponding to the bit amount, and Tg the time corresponding to a range over which the portion of the servo data is not recorded, the bit amount can be calculated by the relation N≧Integer (Tg/Tb)+1 where Integer denotes an integral number.

7. A disk drive comprising:
a disk of a two-layered structure comprised of a data recording medium of a perpendicular magnetic recording system;
a magnetic head comprising a single magnetic pole type head as a write head and a read head; and
a servo controlling configured to effect reproduction by reading servo data by the read head, the servo being recorded by the single magnetic pole type head on servo areas set on a disk in accordance with the magnetic pole thickness of the single magnetic pole type head, wherein the servo controller has the function of erasing, from a reproduction process, the portion of the servo data of a range corresponding to the magnetic pole thickness of the single magnetic pole type head.

8. A disk drive according to claim 7, wherein the portion of the servo data constitutes a foot stamping portion corresponding to the magnetic pole thickness of the single magnetic type and a means is provided which, as the function of erasing the foot stamping portion from the reproduction process, controls the timing of a servo gate necessary to the reproduction of the servo data.

9. A disk drive according to claim 7, wherein with Tb representing a servo data existing time, ΔT the suppression time of a rotation variation of the disk, and Tg the time of a range corresponding to the magnetic pole thickness of the single magnetic pole type head, the servo controller has a timing generation circuit configured to calculate a timing taking time Ts by the relation Ts≦Tb−(2×ΔT+Tg), the time Ts being used to obtain servo burst data generated at a time of the positioning control of the magnetic head.

10. A disk drive according to claim 7, wherein, with Tbs representing the start time point of a servo data existing time, Tbe the end time point of the servo data existing time, ΔT the suppression time of a rotation variation of the disk, and Tg the time of a range corresponding to the magnetic pole thickness of the single magnetic pole type head, the servo controller has a timing generation circuit configured to calculate a timing start point Tss for obtaining the servo data and a timing end time point Tse with the use of the relation Tss≧Tbs−(ΔT+Tg) and a relation Tse≦Tbe−ΔT.

* * * * *